Patented Nov. 17, 1925.

1,562,207

UNITED STATES PATENT OFFICE.

ANDREW GILBERT CROLL, OF WEATHERLY, PENNSYLVANIA, ASSIGNOR TO THE ATLAS PORTLAND CEMENT COMPANY, A CORPORATION OF PENNSYLVANIA.

METHOD OF MAKING CEMENT.

No Drawing. Application filed March 3, 1924. Serial No. 696,687.

*To all whom it may concern:*

Be it known that I, ANDREW GILBERT CROLL, a citizen of the United States, and a resident of Weatherly, county of Carbon, and State of Pennsylvania, have invented certain new and useful Improvements in Methods of Making Cement, of which the following is a description.

My invention relates to hydraulic cement, generally known as Portland cement, and its principal object is to provide an improved method of manufacturing the same, whereby a superior product is obtained having increased tensile and compression strength.

In the manufacture of Portland cement, a calcareous substance and an argillaceous substance are mixed in proper proportions and ground to a suitable fineness either in a dry state or in a wet state, and then fed into a rotary kiln, wherein the mixture is calcined or burned by being subjected to a temperature of about 1500° C. or 2800° F. Upon completion of the burning of the material or mixture, the output, which is generally known as the "clinker," is removed from the kiln.

The cement clinker is in the form of hard, granular lumps which, when it leaves the kiln, is at a white heat, since the temperature of the interior of the kiln itself is approximately 2800° F. In order that the cement clinker may be a merchantable product, it is then necessary to grind the clinker, which is done by suitable mechanical apparatus. To prevent injury to the grinding apparatus and to facilitate the handling of the hot clinker, and to facilitate the seasoning of the cement, that is to say, to improve the quality of the cement as regards its test for soundness when subjected to the steam test, it is more or less common practice at present to apply a small stream of water to the clinker at some point between its exit from the kilns and its entrance into the grinding mills. The purpose of this is three-fold, (1) to reduce the temperature of the clinker so that it may be conveniently handled; (2) to improve its quality as regards soundness, so that the finished product will not unduly expand, and (3) to prevent injury to the grinding apparatus.

I am also aware of United States patents to H. Passow relating to the production of cementitious material from furnace-slag by a cooling process, particularly Patent No. 747,920, December 22, 1903. This and his subsequent patents, however, describe a process applicable to different materials from those which are the subject of the present application, the object of the Passow process being solely the simultaneous production of active and inert substances from furnace-slag, which process is carried out under entirely different conditions from those under which Portland cement is produced.

I have found that a superior merchantable cement product giving to concrete higher compression and tensile strengths than heretofore obtainable, can be produced by manufacturing cement by my improved method. According to my invention, the hot cement clinker is removed from the kiln and immediately cooled. By this I mean that while at a high temperature, preferably above 1500° or 1600° F., the clinker is suddenly chilled by the application of a large quantity of cold fluid, as by quenching the clinker in a bath of cold water, so as to greatly reduce its temperature as rapidly as possible. Sudden chilling of the highly heated clinker by the application of a large quantity of cold fluid differs radically from the application of smaller quantities of water to the partly cooled clinker previously mentioned, and is done for a different and definite purpose. This rapid quenching or sudden chilling of the highly heated clinker is done primarily for the purpose of increasing the strength of the concrete in which my cement is used, the exact nature of the changes brought about by such rapid cooling not being understood by me at this time. I preferably quench the hot clinker with water by applying large quantities of water to it or by immersing it in a bath of water, although I do not limit myself to any particular manner of rapidly cooling the clinker. After the heated clinker has been rapidly cooled and dried, it is then ground into fine particles by suitable apparatus in the usual manner.

I have found when utilizing cement made by my process, in mortars having a mixture of three parts standard Ottawa sand and one part of my improved cement, the tensile strength of such product is increased 10% or more after a seven day set, and that the compression strength of the same product after a seven day set is increased 35% or more, and after longer setting these strengths are correspondingly increased as compared with mortars in which cement is used in the same proportions and with the same Ottawa sand as previously mentioned, but in which no sudden cooling or rapid chilling of the highly heated clinker was employed.

I have also found that in practicing my method of making cement the higher the temperature of the clinker from which it is rapidly cooled or suddenly quenched, the better is the product that is obtained. In order to determine this, I have conducted tests, in one of which the clinker was suddenly quenched at the kiln immediately when it left the kiln, the temperature of the clinker being a white heat, or approximately 2400° F., and I found that the tensile strength of cement mixtures was increased 10% and the compression strength of the same was increased 35% over the cement mixtures made from a cement clinker which was suddenly chilled or immersed in water at a temperature below 1500° F.

While I have described my invention as practiced in a specific manner, it should be understood that I do not limit my invention thereto, since various modifications thereof will suggest themselves to those skilled in the art without departing from the spirit of my invention, the scope of which is set forth in the annexed claims.

What I claim and desire to protect by Letters Patent is:

1. The method of making Portland cement whereby the strength of the resulting product is substantially increased, which comprises burning the ingredients at a clinkering temperature, quenching the clinker substantially at said temperature in a suitable liquid, and grinding the same.

2. The method of making Portland cement whereby the strength of the resulting product is substantially increased, which comprises burning the ingredients at a clinkering temperature, quenching the clinker when at substantially said temperature in water to rapidly cool the same and grinding the clinker.

3. The method of making Portland cement whereby the strength of the resulting product is substantially increased, which comprises burning the ingredients at a clinkering temperature, quenching the clinker at white heat and grinding the same.

4. A step in the process of making Portland cement whereby the strength of the resulting product is substantially increased, comprising immersing the clinker at white heat in a bath of water.

Signed this 29 day of February, 1924.

ANDREW G. CROLL.